Dec. 30, 1969　　　R. A. GUDMUNDSEN　　　3,487,330
HIGH POWER DISSIPATION LASER STRUCTURE

Filed June 30, 1965　　　　　　　　　　　　2 Sheets-Sheet 1

INVENTOR.
RICHARD A. GUDMUNDSEN
BY Robert D. Rogers
ATTORNEY

Dec. 30, 1969    R. A. GUDMUNDSEN    3,487,330
HIGH POWER DISSIPATION LASER STRUCTURE

Filed June 30, 1965    2 Sheets-Sheet 2

INVENTOR.
RICHARD A. GUDMUNDSEN

BY

ATTORNEY

United States Patent Office 3,487,330
Patented Dec. 30, 1969

1

3,487,330
HIGH POWER DISSIPATION LASER STRUCTURE
Richard A. Gudmundsen, Santa Ana, Calif., assignor to North American Rockwell Corporation, a corporation of Delaware
Filed June 30, 1965, Ser. No. 468,257
Int. Cl. H01s 3/02
U.S. Cl. 331—94.5                                    4 Claims

ABSTRACT OF THE DISCLOSURE

A laser structure for dissipating the heat associated with high power operation comprising a plurality of laser material segments spaced along the optical axis of the laser structure in such a manner that heat flows through the segments in the direction of the optical axis. These spaced segments form channels through which is pumped a coolant to absorb the axially flowing heat.

---

The present invention is directed to high power dissipation laser structures and more particularly to fluid coupled and to fluid cooled laser structures utilizing segmented laser materials.

The repetition rates for very high power pulsed lasers of the prior art are limited by the low heat dissipation rates of the laser material during each pulse. This heat dissipation problem has essentially precluded continuous laser operation at reasonably high power levels. The removal of that portion of the pumping energy which is normally converted to heat in the laser material is a paramount problem in maintaining efficient operating temperatures in high average power laser devices. Liquid laser systems have been suggested as one approach in overcoming the operational limitations imposed by heat dissipation. However, while solving the heat dissipation problem, the temperature gradients within the liquid produce refractive index gradients which grossly influence the optical quality of the laser cavity. Therefore, the liquid laser system, while eliminating the heat dissipation problem, merely introduces other more complex problems and has not provided an acceptable means for increasing the average operating power of laser devices.

The present invention is directed to a high power dissipation laser device which has the optical quality and mechanical stability of a solid laser material device and the heat dissipation properties of a flowing liquid laser. It is the main feature of the present invention to provide a laser structure in which the solid laser material is opened up or expanded along the optical axis in such a manner as to optimize heat transfer in the direction of the optical axis to a large convection surface and to utilize a cooling fluid, with an index of refraction matching the laser material. In this manner the reflection losses at the many surfaces of the segmented structure are eliminated while the flowing coolant removes the heat, thereby allowing higher average power and consequently higher repetition rates. Such a segmented structure with fluid cooling has all the properties of a solid laser material device with the only adverse effect being a slight dilution of the active ion concentration resulting from the segmented arrangement.

According to another embodiment of the present invention, a laser arrangement is provided in which the matching of the refractive indices of the segmented laser material and the coolant fluid is not essential. Specifically, this feature of the invention contemplates a laser material coolant fluid interface which intersects the optical axis of the cavity at Brewster's angle.

It is therefore an object of the present invention to provide a laser which can be utilized without the usual heat dissipation problems encountered in attempting to drive conventional large laser rod devices at reasonable repetition rates.

It is another object of the present invention to provide a laser structure in which a fluid coolant is utilized to remove heat axially from the laser material without introducing refractive index gradients which degrade the optical quality of the laser, and to eliminate the radial thermal gradients encountered in prior art laser structures.

It is a further object of the present invention to provide a high power dissipation, fluid cooled laser structure in which the laser material is supported in segments to accommodate coolant flow, thereby affording greater power dissipation capability.

It is a still further object of the present invention to provide a segmented laser structure utilizing a liquid passing between segments and through the optical path to cool the laser material without introducing losses either at liquid-laser material interface or in the liquid coolant itself.

It is an other object of the present inventoin to provide a segmented laser structure utilizing a liquid coolant in the optical path which may be utilized in providing folded beam or other laser device structures for higher average power operation.

These and other objects of the present invention will be more apparent from the following detailed description of various embodiments of the present invention taken together with the drawings, hereby made a part thereof, in which.

Figure 1:
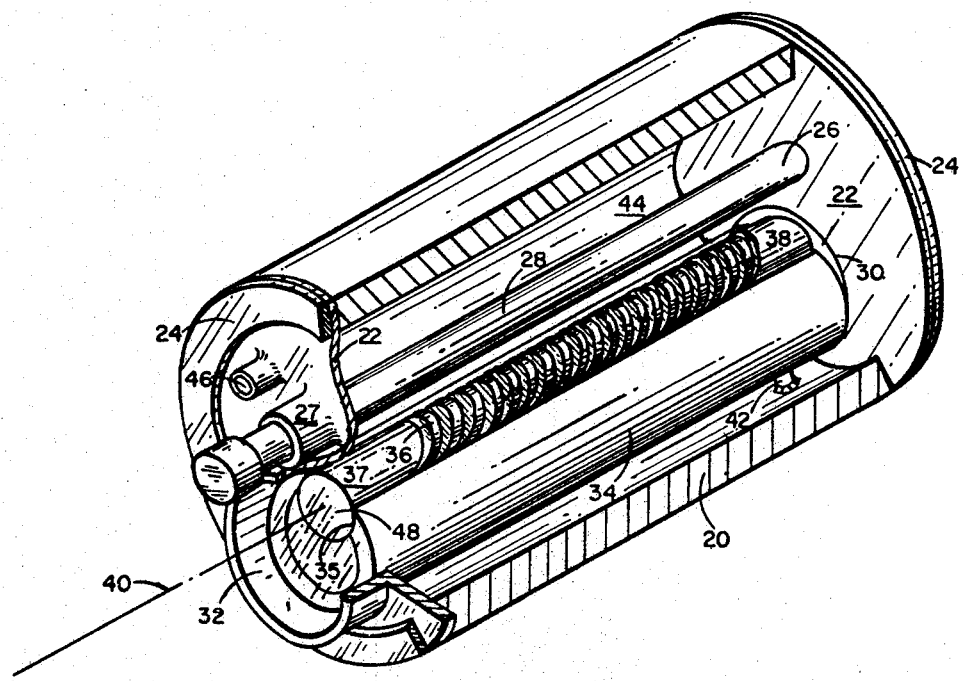
FIG. 1 is a partially sectioned perspective view of one embodiment of the present invention.

Referring now to the drawings in detail, FIG. 1 shows one embodiment of the present invention in which an outer tube 20 is sealed between two end pieces 22 by circular members 24 in any manner well known in the art. Each end piece 24 is provided with small aperture 26 having a flange 27 in which a water cooled flash lamp 28 is supported in sealed engagement to the flange 27, and a large aperture 30 having an outwardly extending flange 32. Supported on the inner edge of flange 32 is a laser support tube 34 extending the full length of tube 20 and having its upper surface 35 cut to support circular discs 36 of laser material. The circular discs 36 are supported by surface 35 in parallel relation to each other along its length with appropriately formed end pieces, e.g., quartz, 37 and 38 placed at each end. Each disc 36 and end pieces 37 and 38 extend into the interior of tube 34 and preferably above the outer peripheral surface of tube 34. The laser discs 36 in this embodiment are supported at an angle to the optical axis 40 of the laser. This angle is equal to Brewster's angle as is explained in more detail hereinafter. It is within the purview of the present invention, however, to support the laser discs 36 in spaced positions normal to the optical axis 40.

The tube 34 is connected through an inlet coolant tube 42 extending through outer tube 20 to a source of coolant. The coolant flowing into the interior of laser support tube 34 flows through the spaces between the laser discs 36 into the volume 44 around the flash lamp 28, thereby cooling the flash lamp and is removed from the laser structure through coolant outlet 46.

The ends of laser support tube 34 are sealed by a front and back mirror sealed to and positioned within the outwardly extending flanges 32. One such mirror is shown at 48 as a dotted line. The sealing may also be accomplished with clear optical windows, using separate external mirrors.

Figure 1A:
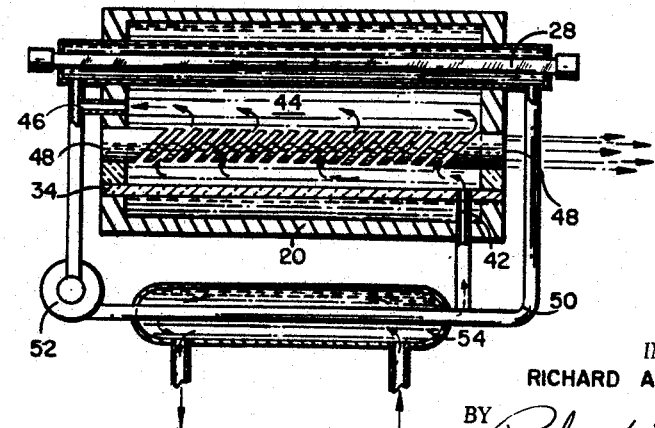
FIG. 1a is a schematic diagram of the embodiment of FIG. 1 showing a modified cooling system.

The schematic diagram of FIG. 1a shows the general arrangement of a laser device similar to FIG. 1 together with the coolant system. In this arrangement, the flash tube 28 is shown as having an independent cooling system 50 forming a parallel arm with the coolant system for the laser structure. The coolant flows from inlet 42 through the stacked spaced laser discs 36 into the volume 44, through outlet 46 to a pump 52 and heat exchange 54.

Figure 2:
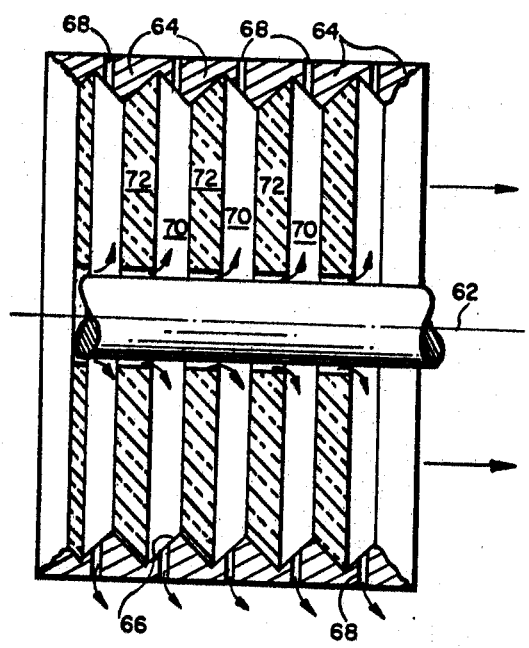
FIG. 2 is a detailed sectional view of a modified segmented laser material and coolant arrangement.

The above described embodiment, utilizing a geometry having the flash lamp offset from the optical axis and laser segments at Brewster's angle to the optical axis, is capable of a variety of modifications. Thus, FIG. 2 shows another geometric arrangement and interrelation of the segmented laser material and the flash lamp. In the arrangement of FIG. 2, a flash lamp 60 is positioned on the optical axis 62 is supported at its ends in any manner well known in the art. An optical axis is defined as an axis having a direction parallel to the direction of the poynting vector and at the center of symmetry of light distribution in an optical system. Surrounding and spaced from the lamp 60 is a tubular laser segment supporting member 64, preferably fabricated in two tubular portions, having a series of grooves or channels 66 in its inner surface and a plurality of ducts 68 connecting the peripheral volume with the channels or passages 70 between laser segments 72. A plurality of circular laser material segments 72 are supported in the grooves 66 and have a central aperture 74 which is larger than the outside diameter of the flash lamp 60. In this embodiment the segments 72 are supported normal to the optical axis 62 although the grooves 66 may be arranged to support the segments at Brewster's angle $\theta$ shown in FIG. 3, where the like numbers refer to corresponding parts as described above with respect to FIG. 2.

Figure 3:
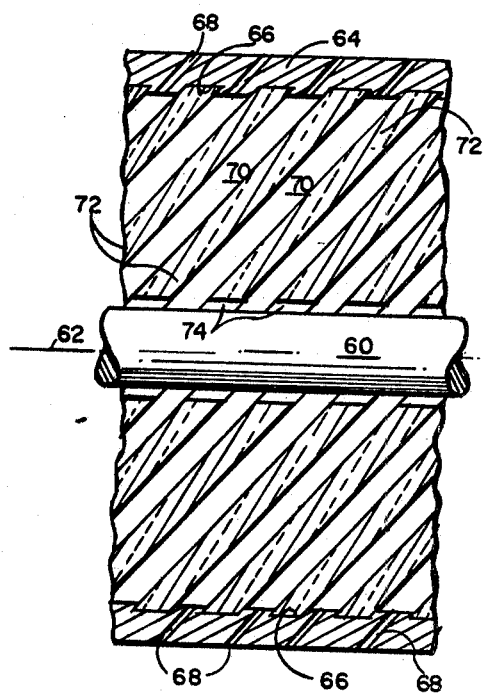
FIG. 3 is a detailed sectional view of another arrangement of segmented laser material and coolant.

The coolant circulation in the embodiment of FIG. 3 may be similar to that of FIG. 2, i.e., along the flash tube 60, through the channels 70 and to the exterior of support member 64 through ducts 68. As in the other embodiments described above, the support member 64 may be of circular cross section as shown in FIG. 1 or may be eliptical, triangular or rectangular in cross section if desired. While the embodiments of FIGS. 1–3 have been described as containing a single stack of segmented circular laser discs, it is clear that the discs 36 and 72 described could be fabricated in any desired shape, e.g., square, triangular, so that a plurality of stacks could be provided within the device. Further, utilizing a plurality of laser stacks would allow various orientations of the coolant channels 70 to be utilized within the same laser structure. The coolant flow direction in the various combinations of laser stacks mentioned could be controlled by suitable baffles.

In the embodiments of FIGS. 1–3 it is important that the laser material 36 and cell end windows 37 and 38 be constructed as a rigid unit in order to preserve optical integrity in the presence of acoustic shocks. Further, the rigid construction of the stacked segments can be treated essentially as an integral rod thereby allowing a wide latitude in geometric configuration.

The liquid cooled segmented laser structure of the above described embodiments has as a primary condition the avoidance of any losses either at the coolant laser interface or in the liquid coolant itself. Losses at the interface of the coolant and the laser segments are avoided either by matching the refractive indices of the coolant-laser material at the laser wavelength, or by positioning the interface at Brewster's angle with respect to the optical axis.

For a system comprising thin discs of active laser material positioned perpendicular to the optical axis (see FIG. 2) the loss primarily results from the reflection at the interfaces. If the number of such interfaces is the order of 100, it is apparent that a small mismatch in the two refractive indices can result in a large loss. For example, the loss for 50, 100 and 200 interfaces, where the ratio of indices of refraction is 1.06, will be approximately 5, 8 and 16 percent respectively. Thus, differences in refractive indices of greater than two percent should be avoided if large power losses resulting from the mismatch of indices is to result.

However, this requirement for close tolerance in indices of refraction can be avoided by positioning the laser segments at Brewster's angle. Further, this arrangement is far less sensitive to changes in liquid refractive index resulting from temperature gradients. Thus, for a stack of 45 laser segements the loss, as a function of the indices of refraction and as a function of incident angle, is negligible. For example, a 2.5 degree variation from Brewster's angle or a variation of as much as 20 percent in the ratio of the indices of refraction introduces only a one percent total loss. Such losses are negligible compared to ordinary scattering losses in the laser medium. It is therefore apparent that the Brewster's angle arrangement allows large temperature variations to take place in the system and allows a higher temperature gradient across the solid-liquid interface which results in very high ratios of heat transfer for greater cooling efficiencies.

Losses due to the liquid alone would result from absorption bands in the liquid coolant at the laser wavelength and can be avoided by proper choice of liquids. For example, for low temperature operation, a saturated $D_2O$ solution of $CaCl_2$ will function down to $-40°$ C. The solution has essentially 100 percent transmission at $1.06\mu$. Another fluid suitable for use as a coolant fluid for a laser wavelength of $1.06\mu$ is a three component solution consisting of $D_2O$, $BaI_2$, and $HgI_2$, i.e., deuterated Rohrback's solution. The temperature coefficient of refractive index of this coolant solution is about $3 \times 10^{-5}/°$ C. while that of $Nd^{+3}$ glass laser material is only about $10^{-5}/°$ C. Thus, no significant loss will be introduced by deviating from the design temperature. Other coolants or solutions will be apparent to those skilled in the art, the required refractive index characteristics of which will vary depending upon the laser material used. For example, coolants which are transparent at both the laser wavelength and pumping wavelength and stable under strong illumination would include water, heavy water, methyl alcohol, benzene or Freon.

The preferred laser material is a $Nd^{+3}$ glass. However, other laser materials capable of exhibiting laser action may also be utilized in the various embodiments of the present invention, e.g., ruby; $Nd^{+3}$: $CaWO_4$; or $Nd^{+3}$: YAG. The use of neodymium-doped $CaWO_4$, because of its low threshold, high efficiency, and narrow bandwidth would improve the performance of the segmented laser structures of the present invention. The refractive index of the selected material should be uniform over the face of the disc. The use of birefringent crystals of laser material will require proper orientation so that they are co-directional.

The laser structure of the present invention may be fabricated from any known solid laser material and have a total aggregated thickness consistent with accepted laser practice. Total thickness may range from one-half inch to the order of 40 inches with each segment having a thickness of at least about 0.010 inches dependent upon the characteristic strength of the selected laser material 72. The diameter may vary from the range of a few millimeters to the order of one inch or larger dependent upon the absorption characteristic of the selected laser material as well known in the art. The spacing 70 between laser discs is governed by the hydraulic behavior of the cooling liquid and is preferably selected to prevent turbulent flow. Thus, spacings in the range of from about 0.005 to about 0.025 may be used. The spacing need not be exactly equal between successive pairs of laser discs 72 but should be uniform between adjacent discs 72 such that all discs are spaced parallel to each other.

The material of the end pieces 37 and 38 may be any transparent material known in the art to have sufficient dielectric strength to withstand the laser beam.

By passing a coolant between the discs of laser material preferably in a manner to alow laminar flow, a significant increase in power dissipation capability is achieved. Thus, for a ¼, ½ or one inch diameter system, the respective increase in power dissipation capability is of the order of 50, 200 and 800.

While preferred embodiments of the present invention have been described, other configurations of high power lasers utilizing the segmented structure of the present invention will be apparent to those skilled in the art. Thus, a compact high average power laser arrangement in which the flash lamp is enclosed by segmented laser material to achieve approximately unity coupling, could be utilized. In such a system the coolant flow would be directed inwardly across the segmented laser materials so that the unheated coolant first crosses the laser material then cools the lamp. A large coolant cross section of the laser segments would provide a small pressure drop to preserve laminar flow, while decreasing coolant cross section at the lamp would provide a high pressure drop in the lamp region. Helical lamps could be utilized to provide a central coolant outlet within the lamp with suitable coolant outlet apertures arranged to cause a uniform pressure lengthwise of the assembly and at each radius outward from the central axis. In this manner the same pressure drop is insured across discs located at the ends of the stack. A plurality of stacks arranged around the central flash lamp would be optically interconnected with bifurcated porro prisms for accomplishing the interconnection or beam folding. Such a beam folding arrangement may be rectangular structure utilizing four segmented laser stacks, or a polygon structure. Thus, the present invention may be utilized in a wide variety of folded-path closed structures.

Another type of laser structure particularly suitable for utilizing the segmented arrangement of the present invention is one utilizing a stack of laser discs arranged as a slab with flash lamps located adjacent to the large area surfaces. Such an arrangement, for example, would utilize a plurality of spaced stacks of laser discs with flash lamp means located between each adjacent pair of stacks. These and many other modifications and configurations utilizing the segmented laser arrangement of the present invention will be apparent to those skilled in the art.

Therefore, although the invention has been described and illustrated in detail, it is to be understood that the same is by way of illustration and example only and is not to be taken by way of limitation, the spirit and scope of this invention being limited only by the terms of the appended claims.

I claim:
1. A laser apparatus, comprising: a plurality of laser segments having substantially parallel faces;
   means for supporting said laser segments in at least one stack and for maintaining adjacent segments of the laser segments in spaced parallel relation along an optical axis and at Brewster's angle with respect to said optical axis, the spaces between said segments forming coolant passages;
   means for optically pumping said laser segments;
   a coolant transparent at both the laser and pumping wavelengths and stable under the pumping illumination;
   means for directing flow of said coolant through said passages across said parallel faces of said segments in contact therewith for transferring heat out of the segments in the direction of the optical axis to minimize radial thermal gradients in said apparatus.
2. The laser apparatus as stated in claim 1, wherein:
   said coolant is selected from the group consisting of water, heavy water, methyl alcohol, benzene and freon.
3. The laser apparatus as stated in claim 1, wherein:
   said means for supporting includes a plurality of coolant ducts connected to said coolant passages.
4. A laser structure, comprising: a plurality of laser material segments spaced along the optical axis of said laser structure at an angle with respect to said optical axis defined by Brewster's angle, said segments having substantially parallel faces;
   a liquid coolant transparent at both the laser and pumping wavelengths and stable under the pumping illumination;
   means for directing the flow of said coolant across said parallel faces of said segments in contact therewith to transfer heat in the direction of said optical axis to minimize radial thermal gradients in the structure; and
   means provided in said apparatus for said coolant to access in spaces between said segments to flow past said parallel faces and to egress from said spaces between said segments.

References Cited

UNITED STATES PATENTS

| | | | |
|---|---|---|---|
| 3,311,846 | 3/1967 | Simpson et al. | 331—94.5 |
| 3,356,966 | 12/1967 | Miller | 331—94.5 |

JEWELL H. PEDERSEN, Primary Examiner
W. L. SIKES, Assistant Examiner

U.S. Cl. X.R.
330—4.3